United States Patent
Naito et al.

(10) Patent No.: US 7,037,396 B2
(45) Date of Patent: May 2, 2006

(54) METHOD OF TREATING PNEUMATIC TIRE

(75) Inventors: Mitsuru Naito, Hiratsuka (JP); Eiji Kawakita, Higashiosaka (JP); Kenji Takeichi, Yao (JP)

(73) Assignees: The Yokohama Rubber Co., Ltd., (JP); Matsumoto Yushi-Seiyaku Co., Ltd., (JP)

( * ) Notice: Subject to any disclaimer, the term of this patent is extended or adjusted under 35 U.S.C. 154(b) by 147 days.

(21) Appl. No.: 10/474,067

(22) PCT Filed: Oct. 4, 2002

(86) PCT No.: PCT/JP02/10347

§ 371 (c)(1),
(2), (4) Date: Oct. 3, 2003

(87) PCT Pub. No.: WO03/033247

PCT Pub. Date: Apr. 24, 2003

(65) Prior Publication Data

US 2004/0112506 A1 Jun. 17, 2004

(30) Foreign Application Priority Data

Oct. 12, 2001 (JP) .............................. 2001-315732

(51) Int. Cl.
*B29C 73/16* (2006.01)

(52) U.S. Cl. ..................... 156/115; 264/36.14; 427/140

(58) Field of Classification Search ................. 156/97, 156/115; 523/166; 427/140; 264/36.14; 106/33
See application file for complete search history.

(56) References Cited

U.S. PATENT DOCUMENTS

| | | | | |
|---|---|---|---|---|
| 4,001,486 A | * | 1/1977 | Phillips | 528/492 |
| 5,277,762 A | * | 1/1994 | Felegi et al. | 162/145 |
| 5,772,747 A | * | 6/1998 | Turner et al. | 106/33 |
| 5,927,348 A | * | 7/1999 | Gerresheim et al. | 141/65 |
| 5,939,514 A | * | 8/1999 | Brown et al. | 528/229 |

FOREIGN PATENT DOCUMENTS

| | | |
|---|---|---|
| JP | 41-014402-YI | 7/1966 |
| JP | 2002-226636 A1 | 8/2002 |
| JP | 2002-363331 A1 | 12/2002 |

OTHER PUBLICATIONS

International Search Report for PCT/JP02/10347 mailed on Jan. 21, 2003.

* cited by examiner

*Primary Examiner*—Geoffrey L. Knable
(74) *Attorney, Agent, or Firm*—Rader, Fishman & Grauer PLLC

(57) ABSTRACT

A method of treating a pneumatic tire, which comprises introducing a repair agent for a punctured tire comprising a latex into the inside of a punctured tire with a rim, followed by sealing, and then introducing a polymer coagulating agent into the inside of the punctured tire to coagulate the repair agent.

3 Claims, 1 Drawing Sheet

METHOD OF TREATING PNEUMATIC TIRE

BACKGROUND OF THE INVENTION

1. Field of the Invention

The present invention concerns a method of treating a pneumatic tire, and more particularly a method of treating a pneumatic tire for making the tire disposable by taking out the pneumatic tire without oozing a repair agent for a punctured tire from a punctured pneumatic tire with a rim wherein the repair agent for punctured tire is introduced into the inside of the punctured tire.

2. Background Art

As a temporary repair method in case of puncture of a pneumatic tire, there is a method for injecting a liquid repair agent for punctured tire into the pneumatic tire, and obstructing the puncture hole from the tire inside. The repair agent for punctured tire used for this method is composed of a latex of O/W dispersion emulsion type wherein natural rubber or the like is dispersed in water, and alkalized with ammonium. This repair agent for punctured tire is injecting in the tire on the order of 500 ml, for obstructing a puncture hole made by sticking a nail or the like with latex.

The repair by this liquid repair agent for punctured tire being temporary, a regular puncture repair shall be performed in a repair shop such as gas station or the like after this temporary repair, or the tire be discarded. However, the repair agent for punctured tire included in the inside of the tire being liquid, there was a problem that the repair agent for punctured tire soils the surroundings by dripping down or otherwise, when the tire with a rim is removed from the wheel for such puncture repair or discard.

SUMMARY OF THE INVENTION

The present invention has an object to provide a method of treating a pneumatic tire composed not to soil the surroundings, when the puncture treated pneumatic tire with a rim is removed from the wheel, by introducing a repair agent for a punctured tire comprising a latex into the inside of a punctured tire, followed by sealing.

The method of treating a pneumatic tire of the present invention to achieve the aforementioned object is characterized in that it comprises introducing the repair agent for punctured tire comprising a latex into the inside of a punctured tire with a rim, followed by sealing, and then introducing a polymer coagulating agent into the inside of the punctured tire to coagulate the repair agent.

Thus, as the polymer coagulating agent being introduced into the inside of a puncture repaired pneumatic tire wherein the repair agent for punctured tire comprising the latex is sealed to coagulate the repair agent for punctured tire, the repair agent for punctured tire would not drips down when the pneumatic tire is removed from the wheel, allowing not to soil the surroundings.

DETAILED DESCRIPTION OF THE PREFERRED EMBODIMENT

Figure 1:
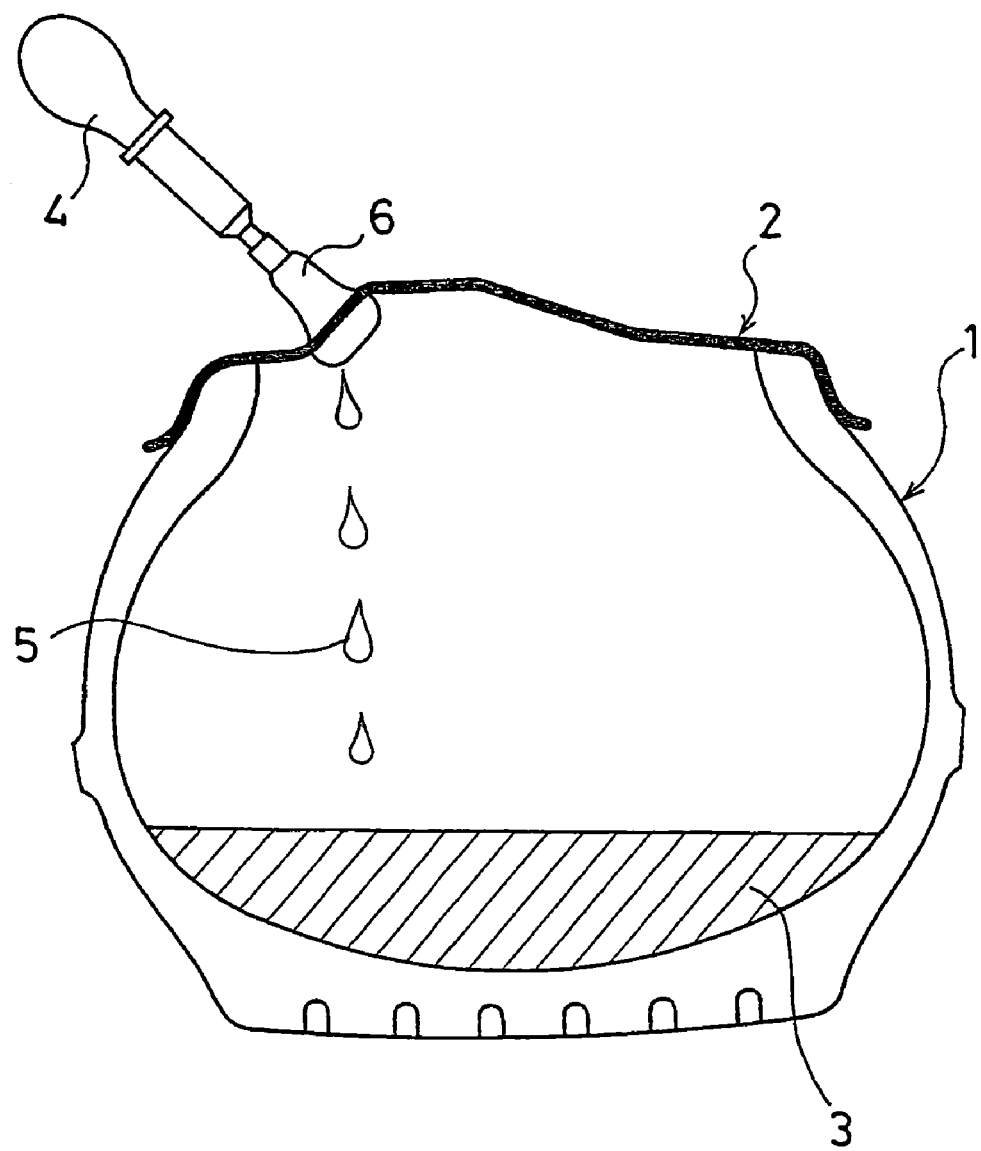
FIG. 1 is a schematic illustrative drawing showing a method of treating a pneumatic tire according to the present invention.

Now, a composition of the present invention shall be described in detail referring to an attached drawing.

In FIG. 1, the numeral 1 indicates a punctured pneumatic tire, which is integrated into a rim 2. This pneumatic tire 1 is, as a temporary measure for the puncture, injected into the inside thereof with a liquid repair agent 3 for punctured tire comprising a latex through a valve 6.

Conventionally, the puncture repaired pneumatic tire 1 as mentioned above, was removed from the rim 2 (wheel) at the repair shop to, for instance, discard in a state where the repair agent 3 for punctured tire in the interior had been eliminated beforehand.

In the present invention, the aforementioned puncture repaired pneumatic tire 1 is left integrated into the rim, and a polymer coagulating agent 5 is dropped and injected through a valve 6 into the interior (inside) of the pneumatic tire from a syringe 4 filled with the polymer coagulating agent. This dripping coagulates the repair agent 3 for punctured tire and the coagulate coagulated in gel deposits on the tire inner wall face and so on.

Thus, the repair agent for a punctured tire becomes a gelled coagulum and deposits for instance on the tire inner wall face, the repair agent for punctured tire will not ooze and soil the surroundings, when the pneumatic tire 1 is removed from the rim 2.

The repair agent for punctured tire may include an organic solvent such as freeze proofing agents including ethylene glycol, propylene glycol or the like; however, such organic solvent can also be prevented from soiling, as it will be included in the gel when it coagulates taking a gel structure.

In the present invention, those repair agents for punctured tire made of a latex comprising a natural rubber or a synthetic rubber dispersed in the water, and alkalized by ammonia are used preferably. This repair agent for punctured tire is injected in the inside of the tire by the order of 500 ml through an air valve, during the puncture repair of a pneumatic tire with a rim. As for rubber of the latex to be used, butyl rubber, styrene-butadiene rubber and so on are used among synthetic rubbers.

The polymer coagulating agent is not particularly limited, provided that it can coagulate the repair agent for punctured tire including liquid components (for instance, mixture components such as ethylene glycol, propylene glycol and so on). For instance, it is at least one kind of polymer or copolymer selected from acrylamide, methacrylamide, acrylic acid, acrylic ester and methacrylate ester and others. More particularly, it is, for instance, an imine type polymer coagulating agent comprising polyethylene imine, an amine type polymer coagulating agent, an acrylamide type polymer coagulating agent comprising acrylamide, a methacrylamide type polymer coagulating agent polymethacryl amide, an acryl ester type polymer coagulating agent comprising polyacryl ester, a methacrylate ester type polymer coagulating agent comprising polymethacryl ester or the like. Also, the mixture of a plurality of polymer coagulating agents selected from these polymer coagulating agents may be used. One which is especially preferable among them is the imine type polymer coagulating agent comprising polyethylene imine.

The polymer coagulating agent is injected in the inside of the tire through for instance an air valve of a tire, in the form of aqueous dispersion. As injector of the injection thereof, those of dropping pipette type or syringe type can be used, and they can be sized according to the addition amount of the polymer coagulating agent.

The polymer coagulating agent is preferably injected in the inside of the tire as aqueous dispersion of 20 to 30 weight %. In case of aqueous dispersion less than 20 weight %, the quantity of polymer coagulating agent to be added is too little, making the coagulation difficult, or the produced gel becomes too soft that it hardly deposits on the tire inner wall surface. On the other hand, in case of that more than 30 weight %, the concentration is too high that the viscosity becomes to high, making difficult to inject from the valve 6 and further, in some cases, making difficult to blend with the repair agent for punctured tire.

As for the injection quantity of the polymer coagulating agent into the inside of the tire, it is preferably to make the proportion of aqueous dispersion of the aforementioned polymer coagulating agent 0.5 to 3 weight % to the repair agent for punctured tire. In case of aqueous dispersion less than 0.5 weight %, the quantity of polymer coagulating agent to be added is too little, making the coagulation difficult, or the produced gel becomes too soft that it hardly deposits on the tire inner wall surface. In case of that more than 3 weight %, the quantity of polymer coagulating agent being excessive, in some cases, the repair agent for punctured tire is inhibited to coagulate, and further, it too much, aqueous dispersion of polymer coagulating agent remain as they are in the tire, in some cases.

When the polymer coagulating agent is added to the repair agent for punctured tire, intermolecular attraction and electrostatic attraction act among the polymer coagulating agent and rubber particulates in the repair agent for punctured tire, and the polymer coagulating agent will be absorbed on the surface of the rubber particulate. Then, the polymer coagulating agent absorbed by the rubber particulate will also be absorbed by the other rubber particulates, a rubber network is formed through the polymer coagulating agent by the chain generation of this absorption, and this will deposit on the tire inner wall surface as a gelled coagulum. At this time, liquid substances such as moisture and ethylene glycol included in the repair agent for punctured tire being also included in the network made of polymer coagulating agent and rubber, it becomes possible to make the liquid substance difficult to flow out.

As mentioned hereinabove, according to the present invention, as a repair agent for a punctured tire comprising a latex is introduced and sealed into the inside of a punctured pneumatic tire with a rim, and then a polymer coagulating agent that can coagulate the latex is introduced into the inside thereof to coagulate the repair agent for punctured tire, the repair agent for punctured tire would not drip down when the pneumatic tire is removed from the wheel, allowing not to soil the surroundings.

What is claimed is:

1. A method of treating a pneumatic tire, which comprises:
    introducing a repair agent for a punctured tire comprising a latex into the inside of a punctured tire with a rim;
    sealing said punctured tire with said repair agent; and then
    introducing a polymer coagulating agent into said inside of the punctured tire to coagulate said repair agent.

2. A method of treating a pneumatic tire of claim 1, wherein:
    said polymer coagulating agent is prepared as aqueous dispersion of 20 to 30 weight %, and the aqueous dispersion is introduced into said inside by the proportion of 0.5 to 3 weight % to said repair agent for the punctured tire.

3. A method of treating a pneumatic tire of claim 1 or 2, wherein:
    said polymer coagulating agent is an imine type polymer coagulating agent comprising polyethyleneimine.

* * * * *